United States Patent [19]
Walter et al.

[11] 3,821,361
[45] June 28, 1974

[54] PROCESS FOR THE RECOVERY OF DEUTERIUM FROM HYDROGEN-RICH GAS

[75] Inventors: Siegfried Walter, Dortmund; Ulrich Schindewolf, Friedrichstal, Baden, both of Germany

[73] Assignee: Friedrich Uhde GmbH, Dortmund, Germany

[22] Filed: June 30, 1971

[21] Appl. No.: 158,241

Related U.S. Application Data

[62] Division of Ser. No. 887,638, Dec. 23, 1969, abandoned.

[52] U.S. Cl. .................................. 423/648, 23/285
[51] Int. Cl. .............................................. C01b 1/00
[58] Field of Search ............... 23/210 I, 193, 285; 423/359, 648, 352

[56] References Cited
UNITED STATES PATENTS
3,055,732  9/1962  Delassus et al. ............... 23/2 R
3,233,971  2/1966  Delassus et al. ............... 23/210

FOREIGN PATENTS OR APPLICATIONS
205,477  3/1924  Great Britain ................. 23/193
1,105,785  3/1968  Great Britain ................. 23/212 R Primary Examiner—Oscar R. Vertiz
Assistant Examiner—Hoke S. Miller

[57] ABSTRACT

A process for the recovery of deuterium from a gas having deuterium values and oxygen bearing impurities by contacting the gas with a solution of sodium or lithium in ammonia to eliminate oxygen-bearing impurities as sparingly soluble reaction products. The $NH_3$-Na or Li solution contacts the synthesis gas saturated with $NH_3$ having oxygen impurities and deuterium values therein and the deuterium rich ammonia gases from a deuterium enrichment unit in order to achieve saturation of higher deuterium concentration. The ammonia gases saturated with deuterium values are finally passed on to the deuterium enrichment unit to recover deuterium values and to produce ammonia depleted of deuterium. The preparation and/or stock tank for the Na -or Li- solution in $NH_3$ is provided with a lining material selected from the group consisting of copper, non-ferrous metal and plastics because the $NH_3$-Na solution resides in these containers for an extended period of time.

2 Claims, 2 Drawing Figures

PATENTED JUN 28 1974

INVENTOR
SIEGFRIED WALTER
ULRICH SCHINDEWOLF

ATTORNEY

PROCESS FOR THE RECOVERY OF DEUTERIUM FROM HYDROGEN-RICH GAS

CROSS REFERENCE TO RELATED APPLICATION

This application constitutes a division of application, Ser. No. 887,638, filed Dec. 23, 1969 which now is abandoned, and entitled PROCESS FOR REMOVING OXYGEN-BEARING IMPURITIES FROM A HYDROGEN-RICH GAS FOR THE RECOVERY OF DEUTERIUM.

BACKGROUND OF THE INVENTION

For the recovery of deuterium from a gas consisting substantially of hydrogen or from a gas mixture containing hydrogen besides other components, such as gas for ammonia synthesis having an $H_2/N_2$ ratio of 3:1, by means of the $NH_3/H_2$ exchange system with $KNH_2$ serving as catalyst, it is necessary that the feed gas mixture be free of oxygen and oxygen-bearing compounds, such as $CO_2$, $CO$, $H_2O$, etc. The oxygen and/or oxygen-bearing compounds react with the exchange catalyst $KNH_2$ to form sparingly soluble reaction products which tend to clog the exchange columns. In addition, losses of potassium amide catalyst occur as impurities penetrate into the exchange system.

It is known that the gas may be subjected to prepurification by scrubbing with $NH_3$ in order to meet the requirement for the absence of oxygen in the form of $H_2O$ and $CO_2$ which are eliminated except for a few ppm. Oxygen and CO contained in the gas are not reduced because they do not react with the $NH_3$. The prepurified gas then undergoes final purification by alkaline amide scrubbing. A gas purified in this way can advantageously be introduced into said enrichment system for deuterium. The alkaline amide may be potassium amide or sodium amide.

The alkaline amide-ammonia solution can be prepared by dissolving alkaline amide in ammonia or by dissolving the alkaline metal in ammonia direct, the alkaline metal forming alkaline amide with the solvent ammonia under the catalytic influence of the shell material of the purification columns, the material of construction being mostly iron or an iron alloy.

The use of $KNH_2$ in this purification step entails a loss of deuterium. This loss is attributable to the phenomenon that $KNH_2$ acts simultaneously as an exchange catalyst. THis means a growing enrichment of the scrubbing solution with isotopes while the purified gas suffers a depletion of isotopes. A certain loss of deuterium cannot be avoided because the reaction products are extracted from the process or withdrawn from the purication column. The loss of potassium depends on the quantity of oxygen-bearing compounds contained in the gas. The hydrogen obtained by modern production methods contains quantities of oxygen-bearing compounds, particularly CO, expressed in terms of ppm, that require the use of great quantities of potassium.

It is also known to use sodium amide for purification. Sodium is much less expensive than potassium. As opposed to potassium, it has, however, the disadvantage that the sodium amide is considerably less soluble in $NH_3$ than the potassium. This low amide concentration would require a big volume of $NH_3$-$NaNH_2$ solution to flow in countercurrent to the gas to be purified in order to remove the impurities. Therefore, equipment dimensions would be relatively large with a consequent increase in plant investment costs. The details described above may be summarized as follows: The use of potassium amide entails losses of deuterium and high production costs; the use of sodium amide means big volumes of scrubbing solution and, therefore, high energy requirements and voluminous equipment which, in turn, means high capital costs.

SUMMARY OF THE INVENTION

The invention is aimed at setting up a purification process in which the volume of scrubbing solution is a minimum in order to reduce utilities and capital costs and which does not entail losses of deuterium.

In accordance with the present invention, the problem is solved in such a way that sodium dissolved in $NH_3$ reacts with the oxygen-bearing impurities to form sparingly soluble reaction products, that the sodium does not have the effect of an exchange catalyst so that losses of deuterium are avoided, and that the synthesis gas rising through the purification column and whose $NH_3$ has a low deuterium concentration is contacted with $NH_3$ of a higher deuterium concentration.

By the process route described above, the synthesis gas from the purification column is saturated with $NH_3$ whose deuterium concentration is equal to the deuterium concentration of the $NH_3$ which is present at the synthesis gas feed point in the circuit of the deuterium enrichment unit.

In order to prevent the described transformation of Na dissolved in $NH_3$ into amide in the presence of iron or iron alloys and, consequently, the disadvantages of sodium amide scrubbing, another characteristic feature included in the invention imposes that the $NH_3$-Na solution be routed through columns, drums, pipes, and pumps that are lined with enamel, copper, or plastics. The particular advantages achieved by the present invention are that the volume of circulating scrubbing solution is a minimum, resulting in a reduction of utilities and capital costs, and that no losses of deuterium are encountered. In addition, sodium requirements are lower than those for potassium because, in view of the different molecular weights, pure sodium is capable of binding - per unit of weight — more impurities than potassium amide. This means that consumption costs for sodium are lower than for potassium even at equal prices.

Considering the price difference between potassium and sodium and the different binding power of the two materials, the ratio of the difference in costs for the purification of the synthesis gas is approximately 10:1 for potassium and sodium respectively.

DESCRIPTION OF PREFERRED EMBODIMENTS

Figure 1:
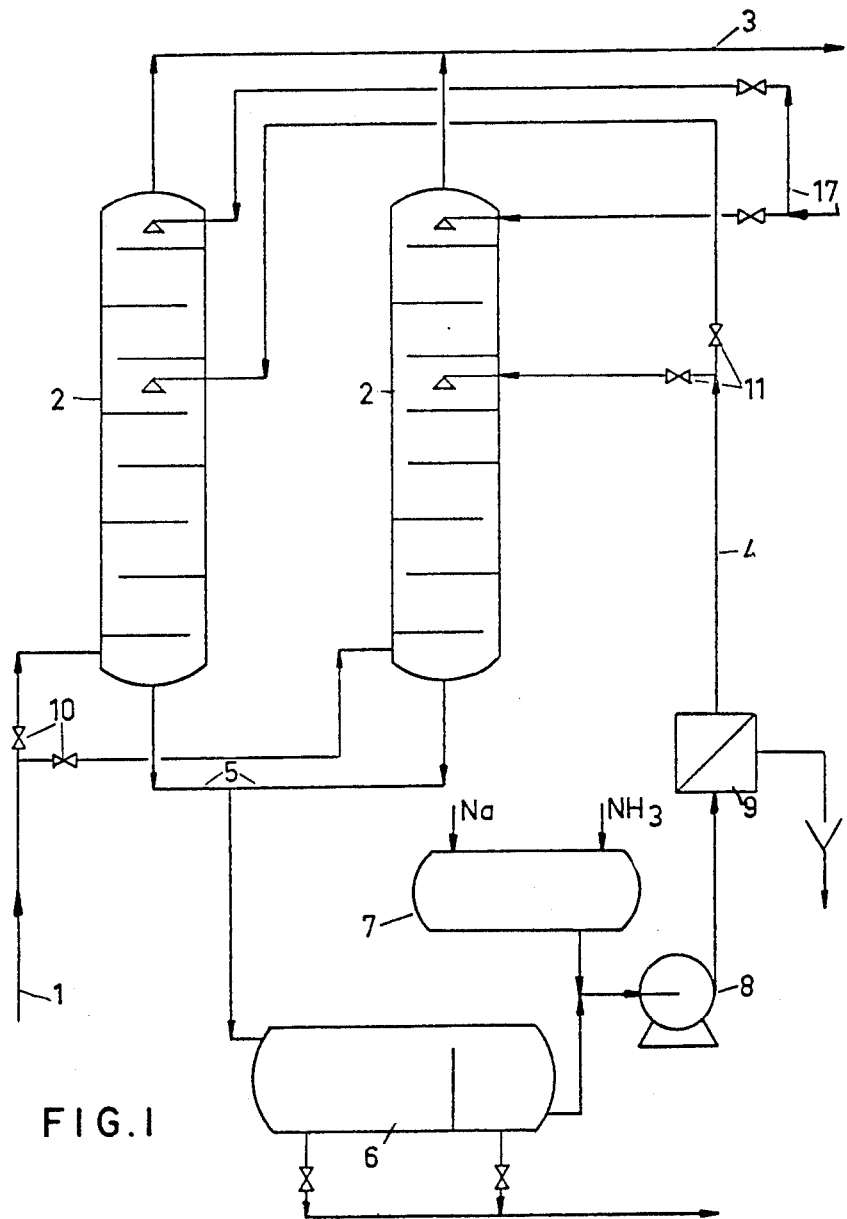
FIG. 1 illustrates a process in which the $NH_3$-Na solution is recycled.

As shown in FIG. 1, the hydrogen or the hydrogen-nitrogen gas mixture which has been freed from $CO_2$ and $H_2O$ in an $NH_3$ scrubbing unit, for example, passes through line 1 to purification column 2. The gas rises through the column in countercurrent to the $NH_3$-Na solution which descends across the column interior. The purified gas leaves the unit through line 3. The fresh $NH_3$-Na solution is admitted to purification column 2 through line 4 and leaves the column through line 5. The columns 2 are conventionally equipped with perforated trays. The reaction products contained in the solution are retained in settling drum 6 from where they are removed periodically. Fresh solution from preparation tank 7 is added to the effluent $NH_3$-Na solution which is practically free of sediments, and the combined stream is recycled to the top of purification column 2 by means of pump 8 through filter 9 where residual reaction products are removed from the solution. The purification columns are preferably installed in pairs and are fed alternately via gas valves 10 and $NH_3$-Na solution valves 11 to permit the shutdown of either column for the removal of insoluble reaction products.

Because the gas in the column is saturated with $NH_3$ of low deuterium concentration at the level of the $NH_3$-Na feed point, $NH_3$ from the deuterium enrichment unit is sent through line 17 to the top of column 2 in countercurrent to the gas in order to achieve a saturation with $NH_3$ of a higher deuterium concentration. The pure gas saturated with isotope-rich $NH_3$ is sent to the deuterium enrichment unit. This saturation with isotopes can also be effected at the top of the upstream $NH_3$ scrubbing column.

An excess of Na is preferably maintained in order to ensure that the recycle solution contains a sufficient amount of free Na.

Figure 2:
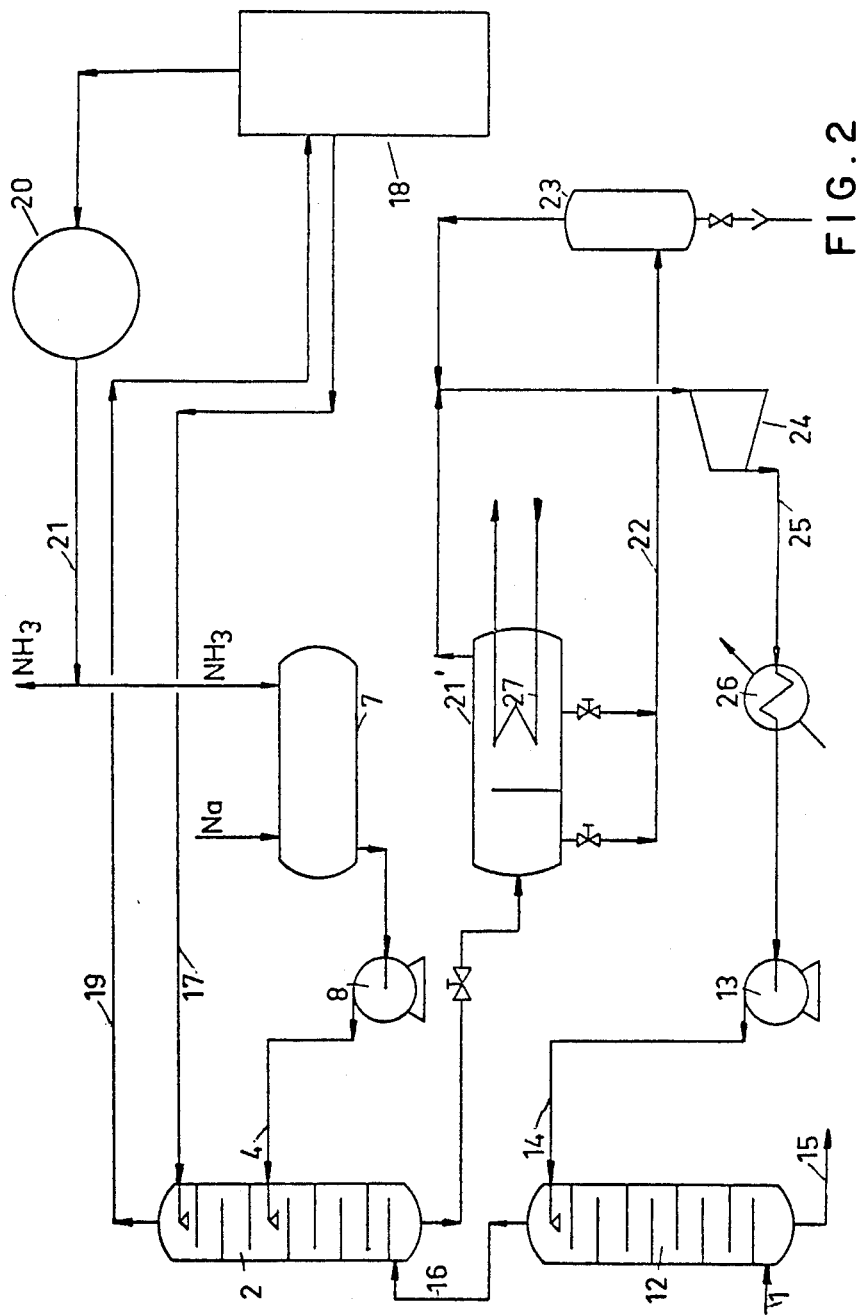
FIG. 2 illustrates a process which incorporates the once-through passage of the $NH_3$-Na solution and which is combined with an $NH_3$ scrubbing unit and an ammonia synthesis plant.

As shown in FIG. 2, the $H_2$ or the $H_2$-$N_2$ gas mixture is admitted through line 1 into the $NH_3$ scrubbing column. In this column, the gas passes in countercurrent to the $NH_3$ for eliminating the impurities which react with the $NH_3$. This pure $NH_3$ is forced by pump 13 through line 14 to the top of column 12 and descends across the interior to the bottom of the column from where it is withdrawn through line 15 and sent to the $NH_3$ storage yard. After leaving column 12, the gas passes through line 16 into the lower part of column 2 where it rises in countercurrent to the $NH_3$-Na solution. The Na concentration of the $NH_3$-Na solution is adjusted as may be necessary for the removal of residual impurities contained in the gas. The solution is withdrawn from preparation tank 7 by means of pump 8 and is admitted through line 4 to the interior of column 2. As the gas in the column is saturated with $NH_3$ of low deuterium concentration at the feed point for the $NH_3$-Na solution, isotope-rich $NH_3$ from the deuterium enrichment unit 18 is sent through line 17 to the top of column 2 where it passes in countercurrent to the gas so that the $NH_3$ arriving at the feed point of unit 18 may have the same isotope concentration as the $NH_3$ present at the feed point. The pure gas saturated with isotope-rich $NH_3$ is sent through line 19 to the deuterium enrichment unit 18 from where the depleted gas passes to the ammonia synthesis plant 20. Part of the pure $NH_3$ produced in the synthesis plant goes through line 21 to preparation tank 7 where the necessary quantity of Na is added to the $NH_3$. The solution is picked up by pump 8 and forced to column 2. Together with the sparingly soluble reaction products of sodium and oxygen as well as oxygen-bearing compounds (CO, $CO_2$, $H_2O$), the solution reaches preparation tank 21' where the impurities settle for being withdrawn subsequently through line 22 into tank 23. By means of refrigerating compressor 24, the $NH_3$ is withdrawn from tanks 21' and 23 and admitted through line 25 to condenser 26. The liquefied $NH_3$ is sent to the suction side of pump 13.

The cold produced in tank 21' through the evaporation of the $NH_3$ is transferred to a refrigerating agent in exchanger 27 and is available for profitable use.

Tank 23 is preferably installed at least in pairs to permit alternate removal of deposits concentrated through the evaporation of $NH_3$.

The process illustrated in FIG. 2 has the additional advantage that a lining of enamel, copper, non-ferrous metal, or plastics is needed only for preparation tank 7 because this is the only point where the $NH_3$-Na solution has a more extended residence time. Pump 8, the line for $NH_3$-Na solution, and column 2 need not be lined because the residence time of the solution is short and no excessive transformation into sodium amide solution takes place in the presence of iron.

Although throughout reference has been made to the use of Na, lithium (Li) can be used advantageously in substitution for Na.

Examples of the above process using Na are as follows:

Column with perforated trays, hole diameter 2 mm
Liquid: $NH_3$
Content: 1 g Na/1 $NH_3$ dissolved
Height of Liquid on the perforated trays h ($NH_3$) = 18 cm
Gas velocity: 51$_{eff}$ $H_2$/h and hole
Pressure: 50 atu
Content on $O_2$ in $H_2$ = 1,000 ppm efficiency of perforated tray: (Bodenwirkungsgrad)

$$BWG = Co - C/Co - Coo$$

Co = Concentration of $O_2$ in the $H_2$ gas (1,000 ppm) before purification
C = Concentration of $O_2$ in the $H_2$ gas after purification
C_ = Concentration at equilibrium, in this case = O Example 1:

$t = -13°C$
BWG = 88 percent

EXAMPLE 2:

$5 = +20° C$
BWG = 90 percent.

What we claim is:

1. A process for the recovery of deuterium values from ammonia-synthesis gases bearing oxygen impurities comprising the steps of:
  1. contacting the ammonia synthesis gases countercurrently with an ammonia solution with sodium metal dissolved therein to produce gases free of the oxygen-impurities and a solution having oxygen-impurities dissolved therein to produce sparingly soluble products,
  2. passing the gases free of the oxygen impurities from Step 1 to a deuterium enrichment unit to effect recovery of deuterium values and to produce ammonia depleted of deuterium,
  3. filtering the solution having oxygen impurities dissolved therein to produce a filtrate and a residue, 4. recycling the filtrate from Step 3 to Step 1,
5. discarding the residue from Step 3,
6. recycling a part of the ammonia depleted of deuterium to prepare the ammonia solution with sodium metal dissolved therein to Step 1.

2. The process according to claim 1 wherein the ammonia solution with sodium metal dissolved therein is prepared and stored in preparation and stock tanks whose lining is made of a material selected from the group consisting of copper, non-ferrous metal and plastics.

* * * * *